(12) United States Patent
Johnson et al.

(10) Patent No.: US 11,556,917 B2
(45) Date of Patent: Jan. 17, 2023

(54) AUTHORIZING A PAYMENT WITH A MULTI-FUNCTION TRANSACTION CARD

(71) Applicant: Capital One Services, LLC, McLean, VA (US)

(72) Inventors: Molly Johnson, Alexandria, VA (US); James Zarakas, Centreville, VA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/948,972

(22) Filed: Oct. 8, 2020

(65) Prior Publication Data

US 2021/0326842 A1    Oct. 21, 2021

Related U.S. Application Data

(63) Continuation of application No. 16/853,066, filed on Apr. 20, 2020, now Pat. No. 10,825,017.

(51) Int. Cl.
| | | |
|---|---|---|
| *G06Q 20/34* | (2012.01) | |
| *G06Q 20/32* | (2012.01) | |
| *G06K 19/077* | (2006.01) | |

(52) U.S. Cl.
CPC ..... *G06Q 20/352* (2013.01); *G06K 19/07707* (2013.01); *G06Q 20/341* (2013.01); *G06Q 20/3574* (2013.01)

(58) Field of Classification Search
USPC .................. 235/380, 451, 462.01, 492, 383
See application file for complete search history.

(56) References Cited

U.S. PATENT DOCUMENTS

| | | | |
|---|---|---|---|
| 9,239,979 B1 * | 1/2016 | McGill | G06Q 20/3276 |
| 10,885,410 B1 * | 1/2021 | Rule | G06Q 20/3226 |
| 2001/0050308 A1 | 12/2001 | Paul et al. | |
| 2002/0074404 A1 * | 6/2002 | Drumm | G06K 7/1095 |
| | | | 235/462.01 |

(Continued)

FOREIGN PATENT DOCUMENTS

WO    0058883 A2    10/2000

OTHER PUBLICATIONS

Co-pending U.S. Appl. No. 16/853,066, filed Apr. 20, 2020.
International Search Report and Written Opinion for Application No. PCT/US2021/070415, dated Jul. 26, 2021, 8 pages.

*Primary Examiner* — Tuyen K Vo
(74) *Attorney, Agent, or Firm* — Harrity & Harrity, LLP

(57) ABSTRACT

A multi-function transaction card may include a card body having dimensions that are in accordance with a standard for transaction cards, an output device on the card body, and a secure element within the card body. The multi-function transaction card may pair, via a wireless connection, the multi-function transaction card with a terminal. The multi-function transaction card may receive, from the terminal, information associated with a transaction. The multi-function transaction card may generate, based on the information associated with the transaction, and using a cryptographic key, an authorization request cryptogram (ARQC), wherein the cryptographic key is stored in the secure element. The multi-function transaction card may generate, based on the ARQC, a machine-readable code. The multi-function transaction card may display, using the output device, the machine-readable code.

20 Claims, 9 Drawing Sheets

(56) References Cited

U.S. PATENT DOCUMENTS

| | | |
|---|---|---|
| 2004/0118923 A1 | 6/2004 | Creamer et al. |
| 2008/0210754 A1 | 9/2008 | Lovett |
| 2009/0289107 A1 | 11/2009 | Prentice |
| 2010/0030592 A1* | 2/2010 | Evans .................... G06Q 10/02 235/382 |
| 2010/0125509 A1 | 5/2010 | Kranzley et al. |
| 2012/0203613 A1 | 8/2012 | Morgan et al. |
| 2013/0332354 A1* | 12/2013 | Rhee .................... G06Q 20/322 705/41 |
| 2014/0101737 A1* | 4/2014 | Rhee .................... G06Q 20/322 726/6 |
| 2014/0156376 A1* | 6/2014 | Sellers ............... G06Q 20/3274 705/14.38 |
| 2014/0287685 A1* | 9/2014 | Griffin ............... H04L 63/0281 455/41.2 |
| 2015/0102104 A1 | 4/2015 | Milsted |
| 2015/0371214 A1 | 12/2015 | Schroder et al. |
| 2016/0088449 A1* | 3/2016 | Sharma .................... G06F 3/017 455/552.1 |
| 2016/0210613 A1* | 7/2016 | McGill ................ H04B 5/0031 |
| 2016/0307082 A1 | 10/2016 | Wurmfeld et al. |
| 2016/0307089 A1 | 10/2016 | Wurmfeld et al. |
| 2016/0307186 A1* | 10/2016 | Noe ..................... G06Q 20/352 |
| 2017/0161720 A1* | 6/2017 | Xing .................... A61B 10/0051 |
| 2017/0345046 A1* | 11/2017 | Raju .................... G06K 7/1413 |
| 2018/0025348 A1* | 1/2018 | Shauh .................. G06Q 20/352 705/44 |
| 2018/0075442 A1 | 3/2018 | Tyler et al. |
| 2018/0114036 A1 | 4/2018 | Spodak et al. |
| 2018/0268403 A1* | 9/2018 | Guglani .................. H04W 4/80 |
| 2018/0276647 A1* | 9/2018 | Geupel ................. G06Q 20/40 |
| 2019/0385160 A1* | 12/2019 | Safak ................. G06Q 20/3274 |
| 2019/0391307 A1* | 12/2019 | Wheatley ................. G02B 5/22 |
| 2019/0392427 A1 | 12/2019 | Wilson |
| 2021/0004786 A1* | 1/2021 | Mossler ............. G06Q 20/3278 |

\* cited by examiner

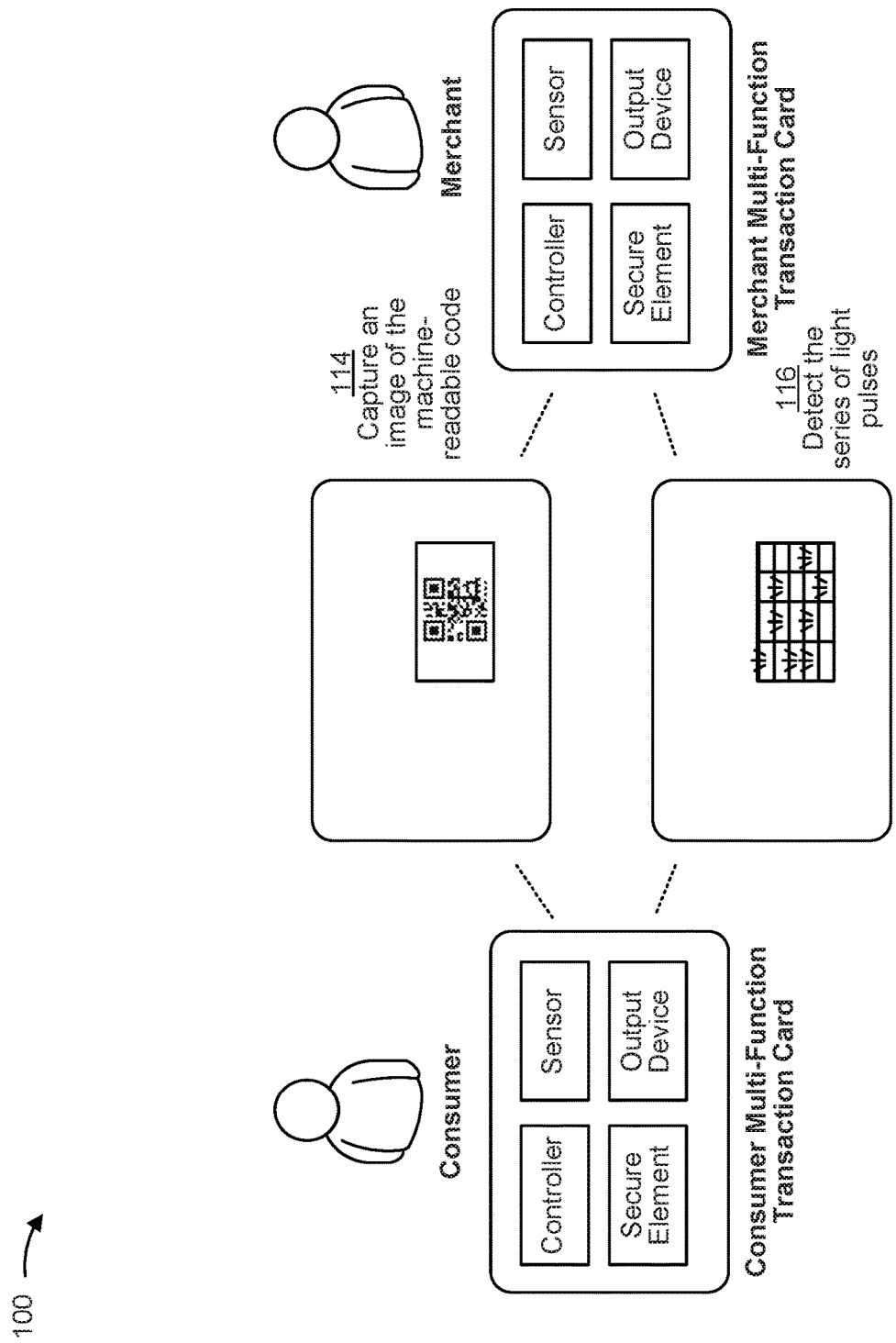

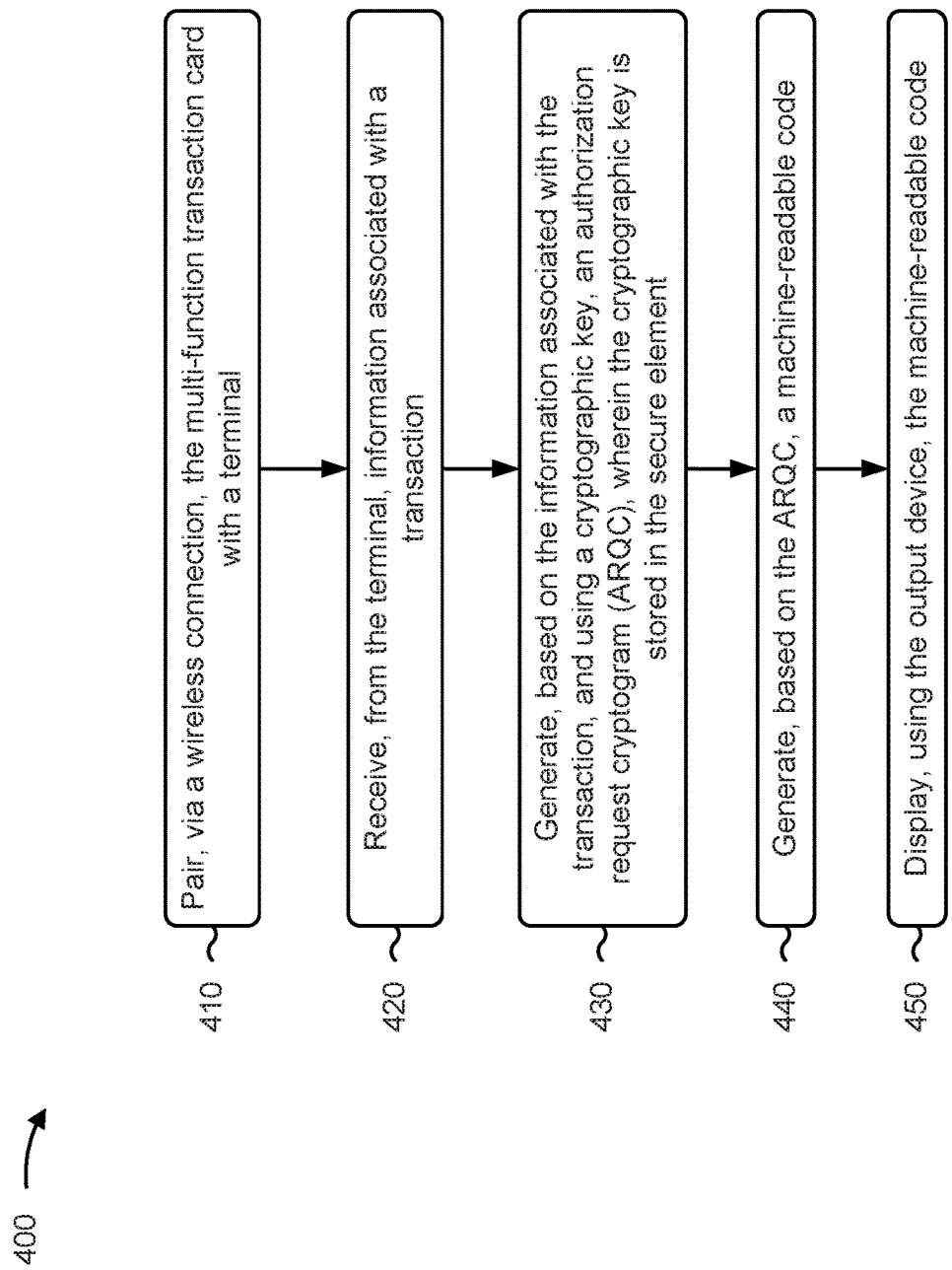

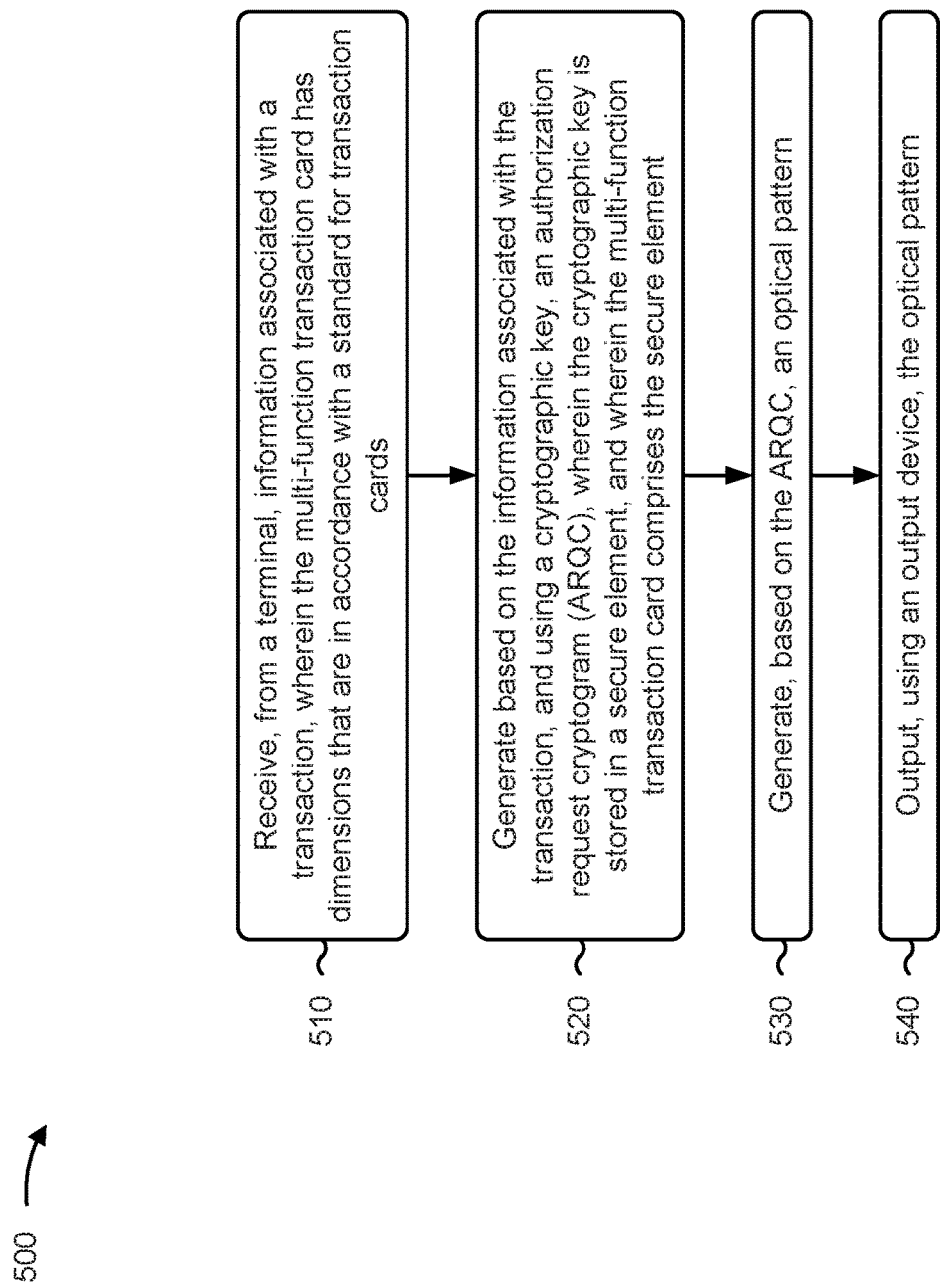

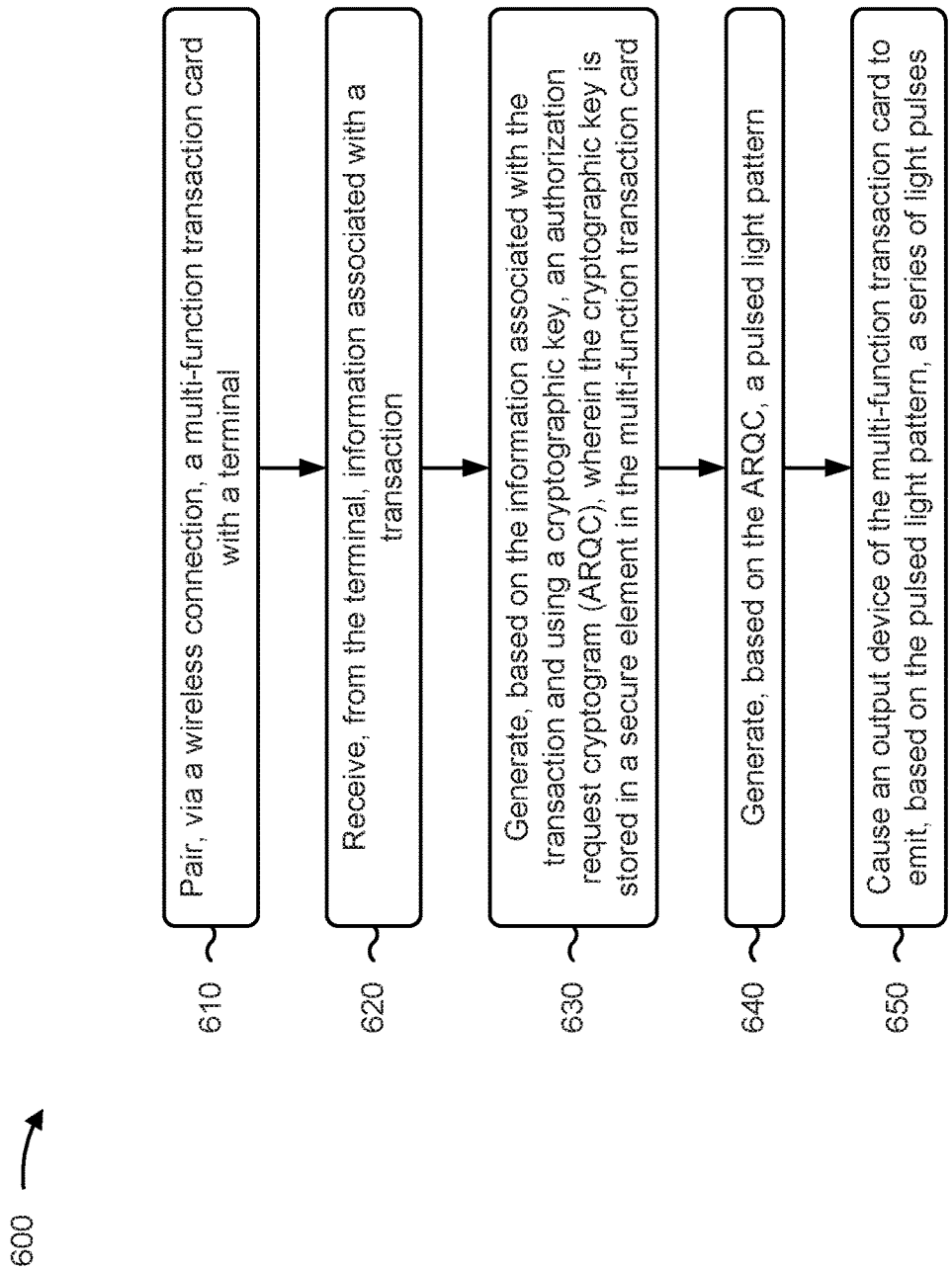

US 11,556,917 B2

AUTHORIZING A PAYMENT WITH A MULTI-FUNCTION TRANSACTION CARD

RELATED APPLICATION

This application is a continuation of U.S. patent application Ser. No. 16/853,066, filed Apr. 20, 2020, which is incorporated herein by reference.

BACKGROUND

A contactless transaction involves the use of a transaction card (e.g., a credit card, a debit card, and/or the like) and a transaction terminal (e.g., a point of sale (PoS) terminal) without a need for the transaction card to contact the transaction terminal to process the transaction. The contactless transaction may require authorization to ensure an accurate and secure payment to complete the contactless transaction.

SUMMARY

According to some implementations, a multi-function transaction card may include a card body having dimensions that are in accordance with a standard for transaction cards; an output device on the card body; a secure element within the card body; one or more memories within the card body; and one or more processors within the card body, wherein the one or more processors are communicatively coupled to the one or more memories, wherein the one or more processors are configured to: pair, via a wireless connection, the multi-function transaction card with a terminal; receive, from the terminal, information associated with a transaction; generate, based on the information associated with the transaction, and using a cryptographic key, an authorization request cryptogram (ARQC), wherein the cryptographic key is stored in the secure element; generate, based on the ARQC, a machine-readable code; and display, using the output device, the machine-readable code.

According to some implementations, a method may include receiving, by a multi-function transaction card and from a terminal, information associated with a transaction, wherein the multi-function transaction card has dimensions that are in accordance with a standard for transaction cards; generating, by the multi-function transaction card, based on the information associated with the transaction, and using a cryptographic key, an authorization request cryptogram (ARQC), wherein the cryptographic key is stored in a secure element, and wherein the multi-function transaction card comprises the secure element; generating, by the multi-function transaction card and based on the ARQC, an optical pattern; and outputting, by the multi-function transaction card and using an output device, the optical pattern.

According to some implementations, a non-transitory computer-readable medium may store one or more instructions. The one or more instructions, when executed by one or more processors, may cause the one or more processors to: pair, via a wireless connection, a multi-function transaction card with a terminal; receive, from the terminal, information associated with a transaction; generate, based on the information associated with the transaction and using a cryptographic key, an authorization request cryptogram (ARQC), wherein the cryptographic key is stored in a secure element in the multi-function transaction card; generate, based on the ARQC, a pulsed light pattern; and cause an output device of the multi-function transaction card to emit, based on the pulsed light pattern, a series of light pulses.

BRIEF DESCRIPTION OF THE DRAWINGS

FIGS. 1A-1D are diagrams of one or more example implementations described herein.

FIGS. 4-6 are flowcharts of example processes for authorizing a payment with a multi-function transaction card.

DETAILED DESCRIPTION

Figure 1A:
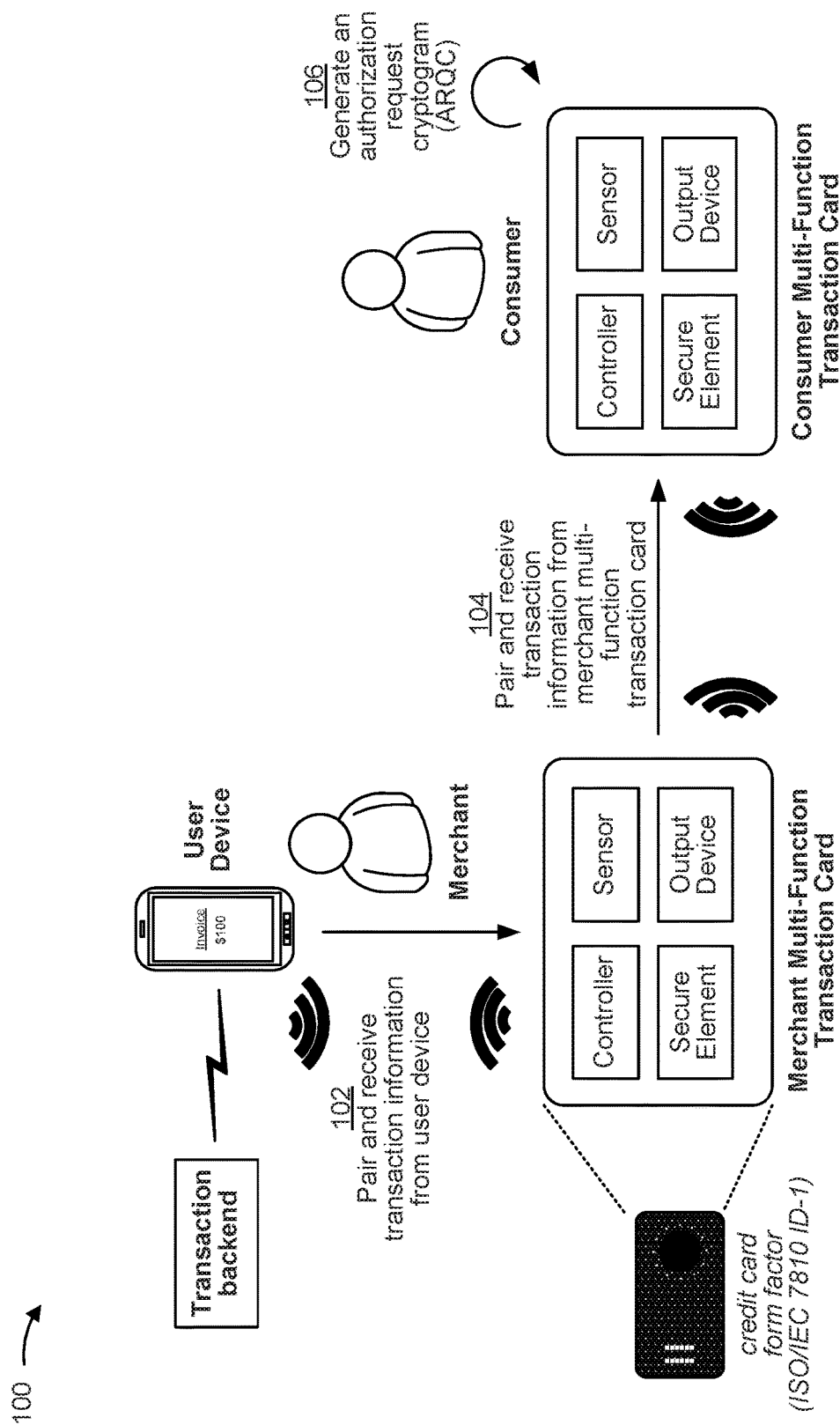

The following detailed description of example implementations refers to the accompanying drawings. The same reference numbers in different drawings may identify the same or similar elements.

To conduct a contactless transaction between a paying device (e.g., a mobile device, a multi-function transaction card, and/or the like) and a receiving device (e.g., another mobile device, a terminal, another multi-function transaction card, and/or the like), the paying device and the receiving device may communicate using near field communication (NFC). However, some paying devices and/or receiving devices do not possess NFC capability. Additionally, the NFC capability of a paying device and/or a receiving device may malfunction. Identifying the NFC issue, investigating the NFC issue, and conducting the contactless transaction by a different method consumes additional computing resources (e.g., processing resources, memory resources, power resources, communication resources, and/or the like) and/or network resources. Additionally, as a transaction may transmit sensitive information from the paying device to the receiving device, the different method of conducting the transaction may increase the risk of fraudulent activity related to the transaction. Identifying, investigating, and/or correcting any fraudulent activity consumes additional computing resources and/or network resources.

Some implementations described herein provide a multi-function transaction card that provides a reliable and secure method of authorizing a payment. As described herein, the multi-function transaction card may pair with a terminal, and may receive, from the terminal, information associated with a transaction (e.g., an amount of the transaction, merchant information, and/or the like). In some implementations, the multi-function transaction card may generate, based on the information associated with the transaction and using a cryptographic key stored in a secure element in the multi-function transaction card, an authorization request cryptogram (ARQC). In some implementations, the multi-function transaction card may generate, based on the ARQC, an optical pattern (e.g., a machine-readable code (e.g., a QR code), a pulsed light pattern, and/or the like), and may output, using an output device, the optical pattern. For example, the multi-function transaction card may display a QR code, and the terminal may capture an image of the QR code. By generating the optical pattern based on the ARQC, the multi-function transaction card may reduce the risk of fraudulent activity and conserve computing resources (e.g., processing resources, memory resources, power resources, communication resources, and/or the like) and/or network resources that would have otherwise been used to identify, investigate, and/or correct fraudulent activity. Additionally, or alternatively, the multi-function transaction card may authorize payments without the use of a near-field communication (NFC) chip, which may reduce a cost of manufacturing of the multi-function transaction card and/or permit the multi-function transaction card to authorize payments when an NFC chip is not working, the terminal does not have an NFC chip, and/or the like.

FIGS. 1A-1D are diagrams of one or more example implementations 100 described herein. As shown in FIGS. 1A-1D, example implementation(s) 100 may include a multi-function transaction card (e.g., associated with a merchant and/or a consumer), a user device, and/or a transaction backend. The multi-function transaction card may wirelessly receive information associated with a transaction from a terminal. The terminal may be a transaction terminal (e.g., a point of sale (PoS) terminal), a multi-function transaction card associated with the merchant, a user device associated with the merchant, and/or the like.

The multi-function transaction card may include a card body having dimensions that are in accordance with a standard. In some implementations, the multi-function transaction card is implemented in a form factor that is in accordance with a standard for transaction cards (e.g., International Organization for Standardization/International Electrotechnical Commission (ISO/IEC) 7810 ID-1). In some implementations, the card body may have dimensions that are in accordance with a standard that is associated with payment cards (e.g., credit cards, debit cards, and/or the like)—e.g., ISO/IEC 7810 ID-1 (e.g., a card body having a size of 85.60 millimeters×53.98 millimeters (3.370 inches× 2.125 inches) and rounded corners with a radius of 2.88 millimeters to 3.48 millimeters).

As shown in FIG. 1A, the multi-function transaction card may include, among other components (e.g., as described elsewhere herein), a controller, a sensor, a secure element, and/or an output device. In some implementations, the multi-function transaction card may include a processor, such as a microcontroller that is capable of executing application logic. In some implementations, the secure element may be included in a transaction integrated circuit (IC) chip (e.g., a EUROPAY®, MASTERCARD®, VISA® (EMV) chip).

As described in more detail below, the multi-function transaction card may be capable of functioning as both a transaction card reader (e.g., a reader that reads other transaction cards, such as payment cards (e.g., credit cards, debit cards, other multi-function transaction cards, and/or the like), to receive payments), and as a payment card (e.g., a card that submits payments to other transaction card readers, such as transaction terminals, user devices, and/or other multi-function transaction cards). In some implementations, the multi-function transaction card may include application logic (e.g., stored in memory in the secure element), such as EMV-based application logic, configured to process card data received from contactless transaction cards, and application logic (e.g., also stored in memory in the secure element) configured to provide card data to transaction terminals for processing. Thus, a user of the multi-function transaction card may, at times, act as a merchant and accept payments from a consumer's contactless transaction card and, at other times, act as a consumer to submit payments using the multi-function transaction card.

As shown in FIG. 1A, a multi-function transaction card may be associated with a merchant (hereinafter referred to as a merchant multi-function transaction card). The merchant may be a provider of goods and/or services. The merchant may conduct a transaction with a consumer using a user device and/or a terminal. In some implementations, the user device and the terminal may be the same device (e.g., a single user device, a single multi-function transaction card, a single PoS terminal, and/or the like). In some implementations, the user device and/or the terminal may communicate with a transaction backend for executing transactions. For example, the user device may receive transaction information. The transaction information may include product information (e.g., a product name, stock keeping unit (SKU) identifier associated with a product, product identifier, and/or the like) for one or more products (e.g., one or more goods and/or services) associated with the transaction, a transaction amount (e.g., a total amount the merchant is charging the consumer for the transaction), merchant information associated with the merchant (e.g., a merchant name, a merchant identifier, and/or the like), a transaction date (e.g., a date on which the transaction is executed), metadata associated with the transaction (e.g., a terminal country code, a transaction currency code, a transaction type, and/or the like), and/or the like.

As shown by reference number 102, the terminal may pair with the user device. For this example, assume that the terminal is a merchant multi-function transaction card. The merchant multi-function transaction card may pair (e.g., establish a secure connection to enable communication) with the user device using a communication protocol (e.g., a personal area network protocol, such as a Bluetooth-based network protocol and/or the like) to communicate via a wireless connection (such as a Bluetooth connection, a Wi-Fi connection, a cellular connection, a near field communication (NFC) connection, and/or the like).

The wireless connection may enable the merchant multi-function transaction card to receive information from the user device and transmit information to the user device. For example, the merchant multi-function transaction card may receive transaction information associated with a transaction from the user device via the wireless connection. The transaction information may be stored by the merchant multi-function transaction card.

A different multi-function transaction card may be associated with a consumer (hereinafter referred to as a consumer multi-function transaction card). The consumer may be associated with the transaction, such as a purchaser of a good or service offered by the merchant. As shown by reference number 104, the consumer multi-function transaction card may pair (e.g., establish a secure connection to enable communication) with the merchant multi-function transaction card device using a communication protocol (e.g., a personal area network protocol, such as a Bluetooth-based network protocol and/or the like) to communicate via a wireless connection (such as a Bluetooth connection, a Wi-Fi connection, a cellular connection, an NFC connection, and/or the like).

The consumer multi-function transaction card may receive information from the merchant multi-function transaction card via the wireless connection. For example, the consumer multi-function transaction card may receive the transaction information associated with the transaction from the merchant multi-function transaction card. The transaction information may be stored by the consumer multi-function transaction card. In some implementations, the consumer multi-function transaction card may receive the transaction information from the user device associated with the merchant, such as via a wireless connection.

In some implementations, the merchant multi-function transaction card may request authorization from the consumer multi-function transaction card to execute the transaction. The request for authorization may be included in the transaction information transmitted to the consumer multi-function transaction card from the merchant multi-function transaction card. Alternatively, the request for authorization may be transmitted separate from the transaction information (e.g., before the transaction information or after the transaction information) transmitted to the consumer multi-function transaction card from the merchant multi-function transaction card. The request for authorization may include a request for the consumer multi-function transaction card to provide information identifying a transaction account (e.g., a bank account, an expense account, a credit account, and/or the like) associated with the consumer and/or the consumer multi-function transaction card to be used to execute the transaction.

As further shown in FIG. 1A, and by reference number 106, the consumer multi-function transaction card may generate an authorization request cryptogram (ARQC). The consumer multi-function transaction card may generate the ARQC in response to receiving the transaction information and/or the request for authorization from the merchant multi-function transaction card. The ARQC may be a cryptogram generated based on the transaction information.

In some implementations, the consumer multi-function transaction card may receive cryptographic keys (e.g., public keys) that the secure element of the consumer multi-function transaction card can use. For example, the consumer multi-function transaction card may receive a cryptographic key from the merchant multi-function transaction card (hereinafter referred to as "the session key"). The session key may be associated with the transaction (e.g., the session key may be unique to the transaction). The session key may be generated based on a standardized scheme (e.g., an EMV scheme).

In some implementations, a cryptographic key (hereinafter referred to as "the card key") may be stored by the consumer multi-function transaction card. In some implementations, the card key is stored by the secure element of the consumer multi-function transaction card. In some implementations, the card key is stored within the secure element of the consumer multi-function transaction card by one or more memories of the consumer multi-function transaction card. The card key may be associated with the consumer multi-function transaction card (e.g., the card key may be unique to the consumer multi-function transaction card). The card key may be generated based on a standardized scheme (e.g., an EMV scheme). The card key may be generated based on a master key associated with the issuer of the consumer multi-function transaction card. The card key may be generated and/or stored within the secure element at a time of manufacture or at a time of issuance of the consumer multi-function transaction card.

The ARQC may be generated based on the transaction information associated with the transaction. The transaction information that the ARQC is based on may be the transaction information received from the merchant multi-function transaction card (e.g., product information for one or more products associated with the transaction, a transaction amount of the transaction, merchant information associated with the merchant, a transaction date of the transaction, metadata associated with the transaction, and/or the like). In some implementations, the transaction information that the ARQC is based on may include information associated with the consumer multi-function transaction card, such as an identifier associated with the consumer multi-function transaction card, a transaction account identifier associated with a transaction account of the consumer, an identifier of the issuer of the consumer multi-function transaction card, and/or the like.

The consumer multi-function transaction card may generate the ARQC based on the transaction information and using the card key. In some implementations, the consumer multi-function transaction card may encrypt (e.g., using a hash function) the transaction information using the card key, resulting in the ARQC. In some implementations, the ARQC may be a 16-character hexadecimal ARQC. In some implementations, the ARQC may take another form. The ARQC may be generated based on a standardized scheme (e.g., an EMV scheme) associated with the consumer multi-function transaction card. The standardized scheme used to generate the ARQC may be based on the issuer of the consumer multi-function transaction card.

The ARQC may be used to provide authorization for a transaction. The ARQC may be a digital signature of the transaction information. For example, a consumer may wish to conduct a transaction with a merchant. The merchant may provide transaction information associated with the transaction to the consumer (e.g., via the user device, terminal, merchant multi-function transaction card, and/or consumer multi-function transaction card, as described herein). The consumer may agree to the terms of the transaction (such as the transaction amount and/or the like) and provide authorization for the transaction, such as via the consumer multi-function transaction card. The ARQC may be included in an authorization message sent from the consumer multi-function transaction card to the terminal (e.g., the merchant multi-function transaction card, a user device associated with the merchant, and/or the like) to verify that the consumer authorized the transaction.

Figure 1B:
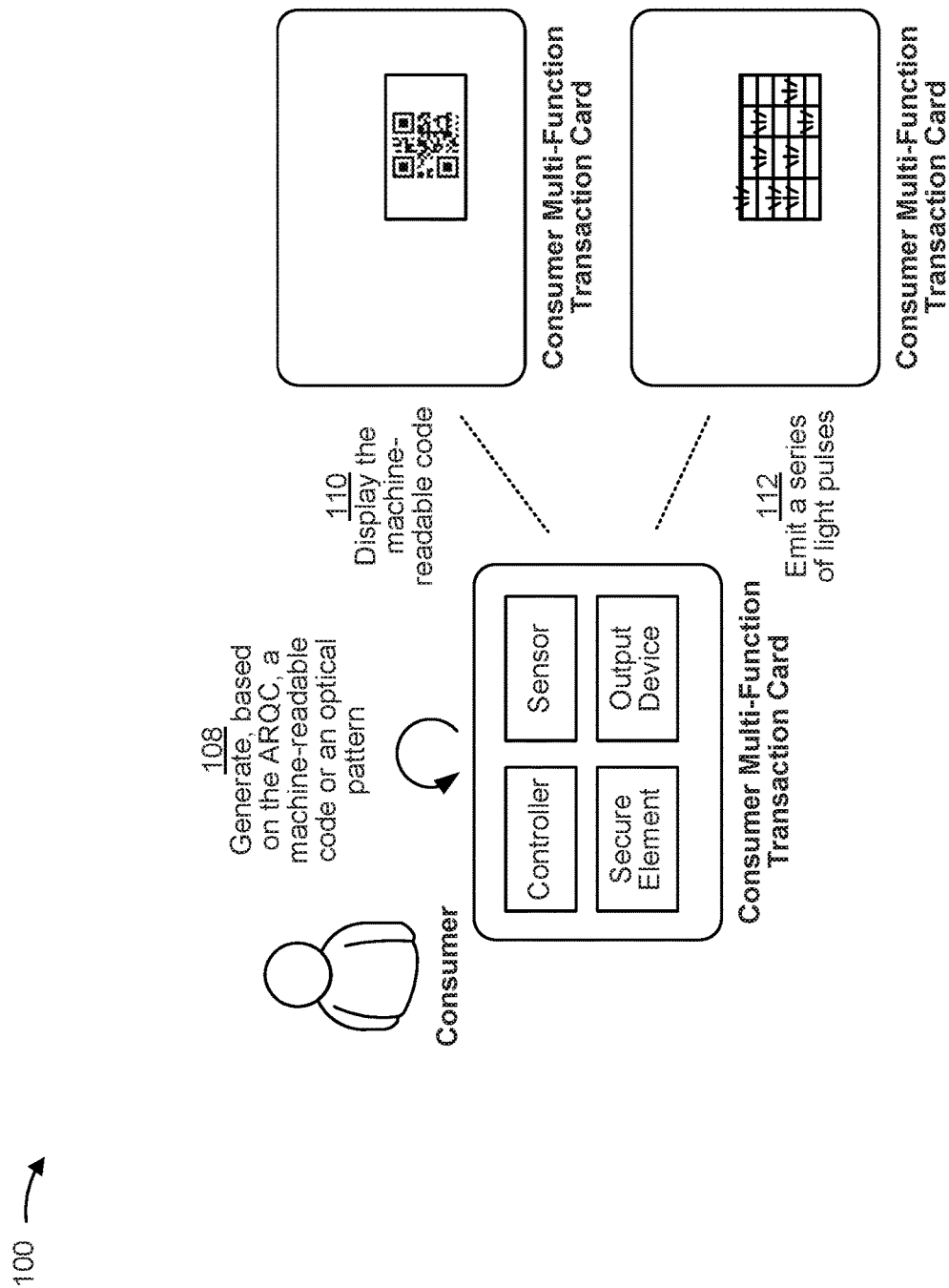

As shown in FIG. 1B, and by reference number 108, the consumer multi-function transaction card may generate, based on the ARQC, an optical pattern (e.g., a machine-readable code, a pulsed light pattern, and/or the like). The optical pattern may be generated such that when another device interprets and/or processes the optical pattern, the other device receives information that includes the ARQC. In some implementations, the optical pattern may be a machine-readable code. The machine-readable code may be a Quick Response (QR) code, a matrix barcode, a one-dimensional barcode, and/or the like. In some implementations, the optical pattern may be a light pattern, such as a pulsed light pattern (e.g., a light pattern generated using pulse-width modulation). The light pattern may utilize visible light communication (VLC) technology to communicate information. The light pattern may utilize an intensity modulation-based modulation scheme, such as color shift keying (CSK). CSK may allow for wireless communication of information based on color variation emitted by a tri-color (red-blue-green (RBG)) LED. In some implementations, the light pattern may include non-visible light.

The consumer multi-function transaction card may include an output device for displaying the optical pattern. The output device may be a dot matrix display, an electronic ink display, a light emitting diode (LED) display, and/or the like. The output device may display the optical pattern as the machine-readable code and/or the light pattern. In some implementations, the output device may display the optical pattern as a combination of both a machine-readable code and a light pattern. For example, a first portion of information (e.g., the information that includes the ARQC) may be communicated via the machine-readable code and a second portion of the information may be communicated via the light pattern. In this way, if either the first portion or the second portion was to be intercepted by a malicious entity, the malicious entity would not gain access to all of the information and, thus, would not be able to recreate the ARQC. As another example, the same information (e.g., the information that includes the ARQC) may be communicated via the machine-readable code and via the light pattern. In this way, more flexibility is provided in terms of how the information may be received by a receiving device.

As shown by reference number 110, the consumer multi-function transaction card may display the generated machine-readable code using the output device. The output device of the consumer multi-function transaction card may display the machine-readable code. In some implementations, the output device may display the machine-readable code on the surface of the consumer multi-function transaction card.

As shown by reference number 112, the consumer multi-function transaction card may emit a series of light pulses associated with the optical pattern. The output device of the consumer multi-function transaction card may emit the series of light pulses. The output device of the consumer multi-function transaction card may emit the series of light pulses using pulse-width modulation.

In some implementations, the consumer multi-function transaction card may be configured to automatically display the optical pattern. In some implementations, the consumer multi-function transaction card may be configured to display the optical pattern in response to receiving the request for authorization and/or the transaction information from the terminal (e.g., the merchant multi-function transaction card, the user device, and/or the like). In some implementations, the consumer multi-function transaction card may be configured to display the optical pattern in response to pairing, via the wireless connection, with the terminal. In some implementations, the consumer multi-function transaction card may be configured to display the optical pattern in response to the generation of the ARQC.

In some implementations, the consumer multi-function transaction card may be configured to display the optical pattern in response to a consumer input. The consumer input may be a touch input. The touch input may relate to a pressure of a touch (e.g., an amount of force applied to the consumer multi-function transaction card by the consumer), a duration of a touch (e.g., an amount of time that the consumer remained in contact with the consumer multi-function transaction card), a tap, a swipe, a pattern of motion (e.g., a circular motion, a triangular motion, a rectangular motion, etc.), a rocking touch, a surface area of a touch, an alternating touch (e.g., simultaneous swipes to the front side and the back side of the consumer multi-function transaction card in opposite directions), a pinching touch (e.g., a simultaneous touch to the front side and the back side of the multi-function transaction card), a rotating action (e.g., a rotating of the transaction card about an axis of the consumer multi-function transaction card), a bending action (e.g., a flexing of the consumer multi-function transaction card performed by applying force to opposite edges of the transaction card), and/or the like. The touch input may be a combination of inputs, such as a tapping, a pinching touch, and a swiping touch. The consumer multi-function transaction card may permit the consumer to define the touch input that is used to trigger display of the optical pattern by the multi-function transaction card.

In some implementations, the consumer input may be a movement input. The movement input may relate to a movement of the consumer multi-function transaction card by the consumer. The consumer multi-function transaction card may sense the movement input using a sensor included in the consumer multi-function transaction card, such as an accelerometer, a gyroscope, a motion sensor, and/or the like. The movement input may be a wave movement (e.g., a movement back-and-forth of the consumer multi-function transaction card in a waving motion), a tap movement (e.g., a movement of the consumer multi-function transaction card tapping against a surface), a circular movement (e.g., a movement of the consumer multi-function transaction card in a circular motion), and/or the like. The consumer multi-function transaction card may permit the consumer to define the movement input that is used to trigger display of the optical pattern by the multi-function transaction card.

In some implementations, the consumer input may be a touch input, a movement input, a combination of one or more touch inputs and/or one or more movement inputs, and/or a sequence of one or more touch inputs and/or one or more movement inputs. The consumer input may be configured by the issuer of the consumer multi-function transaction card. In some implementations, the consumer may configure the consumer input associated with the consumer multi-function transaction card. For example, the consumer may configure a consumer input that is unique to the consumer. The consumer multi-function transaction card may not display the optical pattern unless the consumer multi-function transaction card senses the consumer input associated with consumer multi-function transaction card.

In some implementations, the consumer multi-function transaction card may be configured to display the optical pattern only when in the presence of another device (e.g., a user device) associated with the consumer. For example, the consumer multi-function transaction card may communicate with user device associated with the consumer. If the consumer multi-function transaction card cannot communicate with the user device associated with the consumer, does not sense the user device associated with the consumer, is not in range of the user device associated with the consumer, and/or the like, the consumer multi-function transaction card may be configured to not display the optical pattern.

In this way, an unauthorized user of the consumer multi-function transaction card may not cause the consumer multi-function transaction card to display the optical pattern. As such, the unauthorized user of the consumer multi-function transaction card may not authorize a transaction associated with the consumer multi-function transaction card. Preventing an unauthorized user of the consumer multi-function transaction card from displaying the optical pattern identifies fraudulent activity before a transaction is completed and conserves computing resources that would have otherwise been used to complete the transaction, identify the fraudulent activity, investigate the fraudulent activity, and/or report the fraudulent activity. The issuer associated with the consumer multi-function transaction card and/or the merchant associated with the transaction may also conserve computing resources that would have otherwise been used to reverse the fraudulent activity for the consumer, and/or identify, detect, and diagnose the fraudulent activity.

In some implementations, the consumer multi-function transaction card may display the optical pattern for a predetermined amount of time. The predetermined amount of time may be determined by the consumer, the issuer associated with the consumer multi-function transaction card, a standardized scheme (e.g., EMV), and/or the like. In some implementations, the consumer multi-function transaction card may display the optical pattern only when the consumer multi-function transaction card is physically located proximate to the terminal. The consumer multi-function transaction card may determine that the consumer multi-function transaction card is physically located proximate to the terminal based on the wireless connection (e.g., if the wireless connection is established then the consumer multi-function transaction card is physically located proximate to the terminal), an NFC sensor, and/or the like. In some implementations, the consumer multi-function transaction card may stop displaying the optical pattern based on receiving a consumer input. The consumer input may be the same as, or similar to, the consumer input described above with respect to initiating the display of the optical pattern, described above.

In some implementations, the consumer multi-function transaction card may map aspects of the ARQC, the transaction information, information associated with the consumer multi-function transaction card, information associated with the consumer, information associated with the issuer of the multi-function transaction card, and/or the like, within the optical pattern. In some implementations, certain aspects of the optical pattern may indicate certain aspects that can be used to quickly determine if the optical pattern is genuine or fraudulent. For example, the optical pattern may include portions (e.g., portions of a machine-readable code and/or a pattern of light) that indicate information transmitted from the terminal (e.g., the merchant multi-function transaction card and/or the user device) to the consumer multi-function transaction card. The optical pattern may include portions that indicate the full optical pattern (which can then be used to compare against the optical pattern received by the terminal and/or the transaction backend associated with the issuer of the consumer multi-function transaction card to ensure that the expected full optical pattern matches the received full optical pattern). In some implementations, the optical pattern may include portions that indicate decrypted and/or secure information sent by the terminal and/or the issuer of the merchant multi-function transaction card and/or the consumer multi-function transaction card (e.g., information that only a genuine consumer multi-function transaction card is capable of decrypting, based on the cryptographic key stored by the consumer multi-function transaction card), and/or the like. The terminal and/or the transaction backend associated with the issuer of the merchant multi-function transaction card and/or the consumer multi-function transaction card may identify fraudulent activity based on the mapped portions of the optical pattern as described herein. Identification of fraudulent activity prior to completing the transaction conserves computing resources that would have otherwise been used to complete the transaction, identify the fraudulent activity, investigate the fraudulent activity, and/or report the fraudulent activity.

In some implementations, the consumer and/or the merchant multi-function transaction card may include a sensor. The sensor may be an image sensor (e.g., a sensor that is capable of capturing an image and/or detecting an image). In some implementations, that sensor may be a video sensor (e.g., a sensor that is capable of capturing a video). In some implementations, the sensor may be a camera, such as a microelectromechanical system (MEMS) camera, that is capable of capturing both images and video. In some implementations, the sensor may include a photodiode.

As shown in FIG. 1C, and by reference numbers 114 and 116, the terminal (e.g., the merchant multi-function transaction card and/or user device) may receive the optical pattern by detecting, capturing, and/or recording the optical pattern displayed by the consumer multi-function transaction card. For example, the merchant multi-function transaction card may capture, detect, and/or record the optical pattern displayed by the consumer multi-function transaction card using the sensor of the merchant multi-function transaction card. In some implementations, the merchant multi-function transaction card may scan the consumer multi-function transaction card to detect, capture, and/or record the optical pattern. In some implementations, a user device associated with the merchant may capture, detect, and/or record the optical pattern displayed by the consumer multi-function transaction card using a sensor of the user device.

As shown by reference number 114, the merchant multi-function transaction card may detect and/or capture an image of the optical pattern, such as the machine-readable code. The detected and/or captured image of the optical pattern may be stored by the merchant multi-function transaction card.

As shown by reference number 116, the merchant multi-function transaction card may detect and/or record the optical pattern. For example, the merchant multi-function transaction card may detect and/or record the series of light pulses emitted by the output device of the consumer multi-function transaction card. The series of light pulses may be a series of pulses from different light sources, the same light source turning on and off in a pattern, one or more light sources varying the color emitted by the one or more light sources, and/or the like. For example, as discussed above, the light pattern may be associated with VLC technology. The output device of the consumer multi-function transaction card may modulate light emitted based on a CSK scheme to transmit information. The sensor of the merchant multi-function transaction card may detect, capture, and/or record the light pattern emitted by the output device of the consumer multi-function transaction card. In some implementations, the light pattern emitted by the output device of the consumer multi-function transaction card (or information derived from the light pattern) may be stored by the merchant multi-function transaction card.

In some implementations, the merchant multi-function transaction card may confirm that the optical pattern has been detected, captured, and/or recorded. The merchant multi-function transaction card may provide an indication to the consumer multi-function transaction card and/or the user device indicating whether the merchant multi-function transaction card successfully detected, captured, and/or recorded the optical pattern. In some implementations, the consumer and/or the merchant multi-function transaction card may provide an indication to the consumer and/or the merchant indicating whether the merchant multi-function transaction card successfully detected, captured, and/or recorded the optical pattern. For example, the output device of the merchant and/or the consumer multi-function transaction card may provide an indication (such as a visual indication, such as a green light for a success and a red light for a failure) indicating whether the merchant multi-function transaction card successfully detected, captured, and/or recorded the optical pattern. Based on this indication, the merchant and/or the consumer may know that the attempt to detect, capture, and/or record the optical pattern failed and may use the merchant and/or consumer multi-function transaction card to attempt to recapture, re-detect, and/or re-record the optical pattern.

Figure 1D:
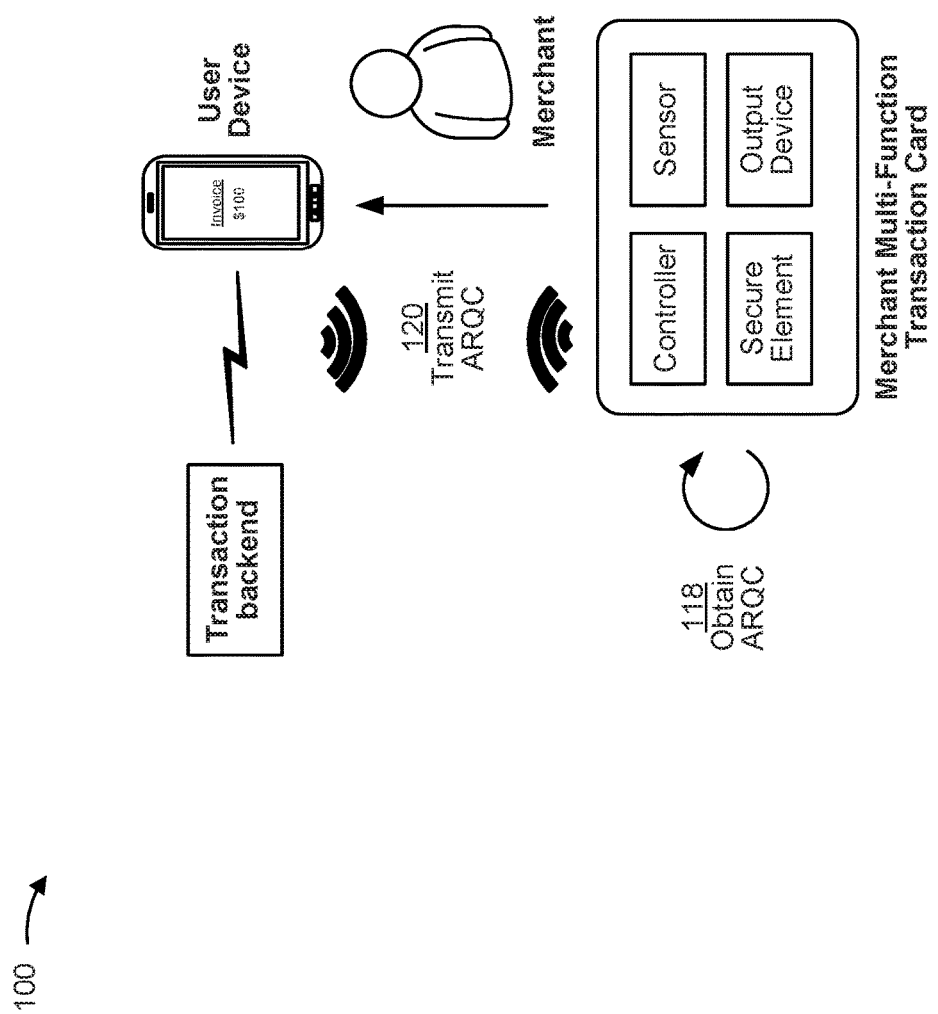

As shown in FIG. 1D, and by reference number 118, the terminal (e.g., the merchant multi-function transaction card and/or the user device) may obtain the ARQC based on the optical pattern. The terminal may obtain the ARQC by interpreting the optical pattern.

For example, the merchant multi-function transaction card may interpret the optical pattern using one or more processors of the merchant multi-function transaction card. The merchant multi-function transaction card may process the multi-function transaction card using Reed-Solomon error correction until the optical pattern can be appropriately interpreted. The merchant multi-function transaction card may interpret the optical pattern based on a standardized method associated with the optical pattern. The obtained ARQC may be temporarily stored by the merchant multi-function transaction card. In some implementations, the ARQC may not be stored at all by the merchant multi-function transaction card.

In some implementations, the merchant multi-function transaction card may obtain additional information along with the ARQC. For example, the optical pattern may include additional information that may be used to determine the authenticity of the consumer multi-function transaction card, the optical pattern, and/or the like, as described above. The merchant multi-function transaction card may use this information to determine if the consumer multi-function transaction card, the optical pattern, and/or the like, are genuine. If the merchant multi-function transaction card determines that the consumer multi-function transaction card, the optical pattern, and/or the like, are not genuine, the merchant multi-function transaction card may not proceed with completing the transaction. If the merchant multi-function transaction card determines that the consumer multi-function transaction card, the optical pattern, and/or the like, are not genuine, the merchant multi-function transaction card may provide an indication to the merchant, such as by providing an indication using the output device of the merchant multi-function transaction card. Identifying a fraudulent consumer multi-function transaction card, optical pattern, and/or the like, by the merchant multi-function transaction card conserves computing resources and/or network resources that would have otherwise been used to transmit the ARQC and complete the transaction, as described herein.

In some implementations, the terminal (e.g., the merchant multi-function transaction card and/or the user device) may not be capable of accessing the information contained in the ARQC. For example, the terminal may not be capable of decrypting the ARQC. In some situations, the terminal may be comprised (e.g., the merchant may be fraudulent, the terminal may be fraudulent, the terminal may be comprised (e.g., by malware), and/or the like). As such, by not allowing the terminal to access the information contained in the ARQC, the information contained in the ARQC is protected, conserving computer resources and/or network resources that would have otherwise been used to identify, investigate, and/or correct fraudulent activity associated with a comprised terminal.

As shown by reference number 120, the terminal may transmit the ARQC. In some implementations, the merchant multi-function transaction card may transmit the ARQC to the user device associated with the merchant. The user device may transmit the ARQC to the transaction backend. In some implementations, the merchant multi-function transaction card may transmit the ARQC to the transaction backend.

In some implementations the terminal (e.g., the merchant multi-function transaction card and/or the user device) may transmit multiple ARQC's associated with one or more transactions to the transaction back end at the same time. For example, the terminal may utilize batch processing for transmitting the ARQC's. In some implementations, the terminal may temporarily store ARQC's. The terminal may transmit the stored ARQC's at predetermined time intervals. For example, the terminal may transmit all stored ARQC's once per hour, once per day, once per week, and/or the like. In this way, the terminal may conserve computing and/or network resources that would have otherwise been used to send each ARQC individually.

The transaction backend may be associated with the issuer of the merchant multi-function transaction card and/or the consumer multi-function transaction card. The transaction backend may store transaction account information (such as transaction account identifier information, consumer information, merchant information, device information, and/or the like) related to the issuer of the merchant multi-function transaction card and/or the consumer multi-function transaction card. The transaction account information may be associated with an account corresponding to the consumer and/or the merchant.

The terminal (e.g., the merchant multi-function transaction card and/or the user device) may communicate with the transaction backend. The terminal may transmit the ARQC to the transaction backend associated with the issuer of the merchant multi-function transaction card and/or the consumer multi-function transaction card. The ARQC may include authorization by the consumer for the transaction associated with the ARQC. The transaction backend associated with the issuer of the merchant multi-function transaction card and/or the consumer multi-function transaction card may confirm that ARQC is genuine (e.g., by decrypting the ARQC, by checking the information within the ARQC, such as information associated with the consumer multi-function transaction card, by checking one or more cryptographic keys associated with the ARQC, and/or the like). The transaction backend associated with the issuer of the merchant multi-function transaction card and/or the consumer multi-function transaction card may confirm the transaction information (e.g., confirm that a transaction account associated with the consumer multi-function transaction card contains sufficient resources to complete the transaction, confirm the transaction account associated with the consumer multi-function transaction card is active, and/or the like). The transaction backend associated with the issuer of the merchant multi-function transaction card and/or the consumer multi-function transaction card may transmit a response code (e.g., accepting or declining the transaction), an authorization response cryptogram (ARPC) (the ARPC may be generated in a manner similar to that as described herein with respect to the ARQC), and/or other information required to complete the transaction. The transaction backend associated with the issuer of the merchant multi-function transaction card and/or the consumer multi-function transaction card may perform the check of the ARQC, and the transaction information contained within the ARQC, in real time. In some implementations, the transaction backend associated with the issuer of the merchant multi-function transaction card and/or the consumer multi-function transaction card may perform the check in batches containing one or more ARQC's.

In this way, the ARQC enables the transaction backend associated with the issuer of the merchant multi-function transaction card and/or the consumer multi-function transaction card to confirm that the consumer multi-function transaction card associated with the transaction is genuine and that the transaction is capable of being executed. The ARQC allows for a cryptographic check that the consumer multi-function transaction card is genuine. Identifying a fraudulent consumer multi-function transaction card before completing the transaction conserves computing resources that would have otherwise been used by a device associated with the consumer to complete the transaction, identify the fraudulent activity, investigate the fraudulent activity, and/or report the fraudulent activity. The issuer associated with the consumer multi-function transaction card and/or the merchant associated with the transaction may also conserve computing resources that would have otherwise been used to reverse the fraudulent activity for the consumer, and/or identify, detect, and diagnose the fraudulent activity.

In some implementations, the terminal (e.g., the merchant multi-function transaction card and/or the user device) may provide a notification indicating the response code (e.g., accepting or declining the transaction). For example, the merchant multi-function transaction card may provide the notification using the output device of the merchant multi-function transaction card.

By generating the optical pattern based on the ARQC, the consumer multi-function transaction card may reduce the risk of fraudulent activity and conserve computing resources and/or network resources that would have otherwise been used to identify, investigate, and/or correct fraudulent activity. Additionally, or alternatively, the consumer multi-function transaction card may authorize payments without the use of a near-field communication (NFC) chip, which may reduce a cost of manufacturing of the multi-function transaction card and/or permit the multi-function transaction card to authorize payments when an NFC chip is not working, the terminal does not have an NFC chip, and/or the like.

In some implementations, the merchant multi-function transaction card may be capable of performing one or more (or all) of the functions described herein with respect to the consumer multi-function transaction card, or vice versa. In some implementations, the merchant multi-function transaction card may be capable of performing one or more functions which is not capable of being performed by the consumer multi-function transaction card, or vice versa. In some implementations, the user device associated with the merchant may be capable of performing one or more (or all) of the functions described herein with respect to the merchant multi-function transaction card, and vice versa.

As indicated above, FIGS. 1A-1D are provided as one or more examples. Other examples may differ from what is described with regard to FIGS. 1A-1D. The number and arrangement of devices shown in FIGS. 1A-1D are provided as one or more examples. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more device) of FIGS. 1A-1D may perform one or more functions described as being performed by another set of devices of FIGS. 1A-1D.

Figure 2:
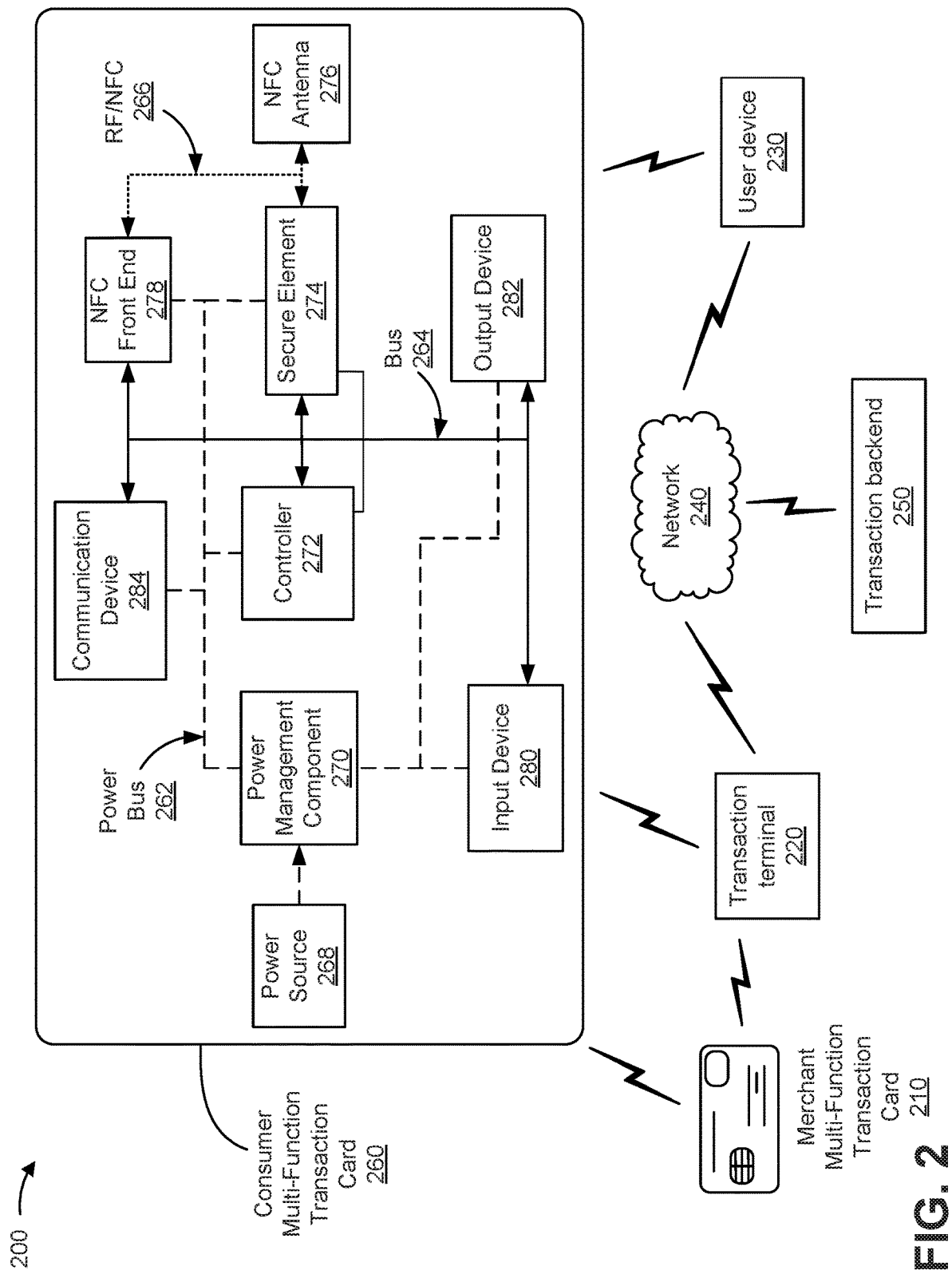
FIG. 2 is a diagram of an example environment in which systems and/or methods described herein may be implemented.

FIG. 2 is a diagram of an example environment 200 in which systems, devices, and/or methods, described herein, may be implemented. As shown in FIG. 2, environment 200 may include a merchant multi-function transaction card 210, a transaction terminal 220, a user device 230, a network 240, a transaction backend 250, and a consumer multi-function transaction card 260. Devices of environment 200 may interconnect via wired connections, wireless connections, or a combination of wired and wireless connections.

Merchant multi-function transaction card 210 includes a transaction card capable of storing and/or communicating data for a PoS transaction with transaction terminal 220 and/or consumer multi-function transaction card 260. For example, merchant multi-function transaction card 210 may store or communicate data including account information (e.g., an account identifier, a cardholder identifier, etc.), expiration information of merchant multi-function transaction card 210, banking information, transaction information (e.g., a payment token), and/or the like. For example, to store or communicate the data, merchant multi-function transaction card 210 may include a magnetic stripe and/or an IC chip (e.g., an EMV chip and/or the like).

In some implementations, merchant multi-function transaction card 210 may include an antenna to communicate data associated with merchant multi-function transaction card 210. The antenna may be a passive radio frequency (RF) antenna, an active RF antenna, and/or a battery-assisted RF antenna. In some implementations, merchant multi-function transaction card 210 may be a smart transaction card, capable of communicating wirelessly (e.g., via Bluetooth, Bluetooth Low Energy (BLE), near-field communication (NFC), and/or the like) with a computing device, such as transaction terminal 220 and/or consumer multi-function transaction card 260, a digital wallet, and/or another device. In some implementations, merchant multi-function transaction card 210 may communicate with transaction terminal 220 and/or consumer multi-function transaction card 260 to complete a transaction (e.g., based on being moved within communicative proximity of transaction terminal 220 and/or consumer multi-function transaction card 260).

Transaction terminal 220 includes one or more devices to facilitate processing a transaction via merchant multi-function transaction card 210 and/or consumer multi-function transaction card 260. Transaction terminal 220 may include a PoS terminal, a security access terminal, an ATM terminal, a multi-function transaction card (e.g., merchant multi-function transaction card 210), a user device (e.g., user device 230), and/or the like. Transaction terminal 220 may include one or more input devices and/or output devices to facilitate obtaining transaction card data from merchant multi-function transaction card 210 and/or consumer multi-function transaction card 260, and/or interaction or authorization from a cardholder of merchant multi-function transaction card 210 and/or consumer multi-function transaction card 260. Example input devices of transaction terminal 220 may include a number keypad, a touchscreen, a magnetic stripe reader, a chip reader, and/or an RF signal reader. A magnetic stripe reader of transaction terminal 220 may receive transaction card data as a magnetic stripe of merchant multi-function transaction card 210 and/or consumer multi-function transaction card 260 is swiped along the magnetic stripe reader. A chip reader of transaction terminal 220 may receive transaction card data from an IC chip (e.g., an EMV chip) of merchant multi-function transaction card 210 and/or consumer multi-function transaction card 260 when the chip is placed in contact with the chip reader. An RF signal reader of transaction terminal 220 may enable contactless transactions from merchant multi-function transaction card 210 and/or consumer multi-function transaction card 260 by obtaining transaction card data wirelessly from merchant multi-function transaction card 210 and/or consumer multi-function transaction card 260 as merchant multi-function transaction card 210 and/or consumer multi-function transaction card 260 comes within a range of transaction terminal 220 at which the RF signal reader may detect an RF signal from an RF antenna of merchant multi-function transaction card 210 and/or consumer multi-function transaction card 260. Example output devices of transaction terminal 220 may include a display device, a speaker, a printer, and/or the like.

User device 230 includes one or more devices capable of receiving, generating, storing, processing, and/or providing information associated with merchant multi-function transaction card 210 and/or consumer multi-function transaction card 260. For example, user device 230 may include a communication device and/or a computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, user device 230 may include application logic capable of facilitating communications between transaction terminal 220 and consumer multi-function transaction card 260.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 250 includes one or more devices associated with banks and/or transaction card associations that authorize transactions and/or facilitate a transfer of funds or payments between an account of a cardholder of merchant multi-function transaction card 210 and/or consumer multi-function transaction card 260 and an account of an individual or business of transaction terminal 220. For example, transaction backend 250 may include one or more devices of one or more issuing banks associated with a cardholder of merchant multi-function transaction card 210 and/or consumer multi-function transaction card 260, one or more devices of one or more acquiring banks (or merchant banks) associated with transaction terminal 220, and/or one or more devices associated with one or more card associations (e.g., VISA®, MASTERCARD®, and/or the like) associated with merchant multi-function transaction card 210 and/or consumer multi-function transaction card 260. Accordingly, in response to receiving transaction card data associated with merchant multi-function transaction card 210 and/or consumer multi-function transaction card 260 from transaction terminal 220, various banking institutions and/or card associations of transaction backend 250 may communicate to authorize the transaction and/or transfer funds between the accounts associated with merchant multi-function transaction card 210, consumer multi-function transaction card 260, and/or transaction terminal 220.

In some implementations, transaction backend 250 may include one or more devices associated with security that may provide or deny authorization associated with transactions. For example, transaction backend 250 may store and/or provide security access information that may or may not allow access through an access point (e.g., a gate, a door, and/or the like) of a secure location (e.g., a room, a building, an geographical area, a transportation terminal, and/or the like) based on information (e.g., account information, a key, an identifier, credentials, and/or the like) associated with merchant multi-function transaction card 210 and/or consumer multi-function transaction card 260 and/or provided by transaction terminal 220.

In some implementations, transaction backend 250 may include one or more devices associated with a rewards program relating to merchant multi-function transaction card 210, consumer multi-function transaction card 260, and/or an entity (e.g., a bank, a merchant, a service provider, a vendor, and/or the like) associated with merchant multi-function transaction card 210, consumer multi-function transaction card 260, and/or transaction terminal 220. For example, transaction backend 250 may authorize the earning and/or redemption of rewards (e.g., rewards points associated with merchant multi-function transaction card 210 and/or consumer multi-function transaction card 260, cash rewards, client loyalty rewards associated with an entity associated with transaction terminal 220, and/or the like) based on a transaction processed by transaction terminal 220 with merchant multi-function transaction card 210 and/or consumer multi-function transaction card 260.

Consumer multi-function transaction card 260 includes a transaction card capable of storing and/or communicating data for a PoS transaction with transaction terminal 220, and capable of receiving and/or storing data for a PoS transaction with merchant multi-function transaction card 210. For example, consumer multi-function transaction card 260 may store or communicate data including account information (e.g., an account identifier, a cardholder identifier, etc.), expiration information of consumer multi-function transaction card 260, banking information, transaction information (e.g., a payment token), and/or the like. For example, to store or communicate the data, consumer multi-function transaction card 260 may include a magnetic stripe and/or an IC chip (e.g., an EMV chip and/or the like).

In some implementations, consumer multi-function transaction card 260 may include a card body in or on which various components are embedded. In some implementations, consumer multi-function transaction card 260 may include an antenna to communicate data associated with transaction terminal 220 and/or merchant multi-function transaction card 210. The antenna may be a passive RF antenna, an active RF antenna, and/or a battery-assisted RF antenna. In some implementations, consumer multi-function transaction card 260 may be a smart transaction card, capable of communicating wirelessly (e.g., via Bluetooth, BLE, NFC, and/or the like) with a computing device, such as transaction terminal 220, merchant multi-function transaction card 210, a digital wallet, and/or another device. In some implementations, consumer multi-function transaction card 260 may communicate with transaction terminal 220, merchant multi-function transaction card 210, and/or the like to complete a transaction (e.g., based on being moved within communicative proximity of transaction terminal 220, merchant multi-function transaction card 210, and/or the like). In some implementations, consumer multi-function transaction card 260 may include one or more components and/or one or more functionalities of transaction terminal 220 and/or one or more components and/or functionalities of merchant multi-function transaction card 210.

Power bus 262 includes a component that permits the delivery of power to various components of consumer multi-function transaction card 260. Bus 264 includes a component (e.g., a serial communication bus, such as a serial peripheral interface (SPI) bus, a universal asynchronous receiver-transmitter (UART)-based bus, a bus based on the inter-integrated circuit (I2C) protocol, and/or the like) that permits communication among various components of consumer multi-function transaction card 260. RF/NFC 266 may include a communication link that permits data delivery between secure element 274, NFC antenna 276, and NFC front end 278.

Power source 268 includes one or more devices, internal to consumer multi-function transaction card 260, capable of supplying power. For example, power source 268 may include a battery (e.g., a rechargeable battery, a non-rechargeable battery, and/or the like), a power supply, a capacitor (e.g., a supercapacitor, an ultracapacitor, and/or the like), and/or the like. In some implementations, consumer multi-function transaction card 260 (e.g., controller 272, secure element 274, and/or NFC front end 278) may obtain power from power source 268 when consumer multi-function transaction card 260 is to perform a transaction. In some aspects, consumer multi-function transaction card 260 may include a single power source 268, which may supply power for performing a transaction and/or may supply power to one or more other components of consumer multi-function transaction card 260 (e.g., a processor, a storage component, an input component, an output component, a communication interface, and/or the like). In some aspects, consumer multi-function transaction card 260 may include multiple power sources 268. In some aspects, a single power source 268 may be dedicated to supplying power solely for performing a transaction, while other power sources 268 may supply power to other components of consumer multi-function transaction card 260. In some implementations, consumer multi-function transaction card 260 may include one or more solar cells and associated circuitry that enable various components of consumer multi-function transaction card 260 to be powered by solar energy.

Power management component 270 includes one or more devices capable of controlling the delivery of power to various components of consumer multi-function transaction card 260 and/or controlling charging of power source 268. For example, power management component 270 may include a switch, a gate, a controller, a regulator, a processing component, and/or the like. In some implementations, power management component 270 may include a bidirectional logic level shifter to control signals between controller 272 and secure element 274 (e.g., to couple or decouple controller 272 and secure element 274, to prevent signals from being passed between controller 272 and secure element 274, and/or the like). Additionally, or alternatively, power management component 270 may include a diode (e.g., an ideal diode) and/or a switch (e.g., a load switch) to control signals between power source 268 and secure element 274 (e.g., to couple or decouple power source 268 and secure element 274, to prevent signals from being passed between power source 268 and secure element 274, and/or the like).

Controller 272 includes one or more devices capable of receiving, generating, storing, processing, and/or providing information and/or instructions that assist with performing a transaction. For example, controller 272 may include a processor, such as processor 320 described below in connection with FIG. 3. Additionally, or alternatively, controller 272 may include memory, such as memory 330 described below in connection with FIG. 3. In some implementations, controller 272 may be directly, communicatively coupled to secure element 274 (e.g., via a dedicated, single-wire communication link).

Secure element 274 includes one or more devices capable of securely hosting an operating system and/or an application, and/or storing confidential information (e.g., a credential, cryptographic information, and/or the like). For example, secure element 274 may include a universal integrated circuit card (UICC), a secure digital (SD) card (e.g., a microSD card and/or the like), an embedded secure element, and/or the like. In some implementations, secure element 274 may include a tamper resistant hardware platform. In some implementations, secure element 274 may include one or more processors (e.g., one or more microcontrollers) certified by a standard body group, such as an EMV Consortium (EMVCo) certified (e.g., 16-bit and/or the like) secure microcontroller.

In some implementations, secure element 274 may host a personalized card application and a cryptographic key required to perform a financial transaction (e.g., with transaction terminal 220). In some implementations, secure element 274 may receive a cryptographic key required to perform a financial transaction (e.g., with merchant multi-function transaction card 210), as described elsewhere herein. In some implementations, secure element 274 may store a credential associated with consumer multi-function transaction card 260, such as a username, a password, biometric information, a token, a certificate for signing documents, and/or the like. In some implementations, secure element 274 may store a credential (e.g., a username, a password, biometric information, a token, a certificate for signing documents, and/or the like) associated with another transaction card (e.g., merchant multi-function transaction card 210), as described elsewhere herein.

In some implementations, secure element 274 may include application logic configured to communicate with NFC front end 278 (e.g., to cause NFC front end 278 to provide card data from secure element 274 to transaction terminal 220 to submit a payment, to cause NFC front end 278 to receive card data from another transaction card (e.g., merchant multi-function transaction card 210) to process a payment, and/or the like). In some implementations, secure element 274 may include application logic configured to communicate with controller 272 (e.g., to cause controller 272 to communicate with a user device (e.g., user device 230) to facilitate online data authentication relating to a transaction (e.g., with merchant multi-function transaction card 210), to receive instructions from controller 272 to initiate transaction processing (e.g., associated with merchant multi-function transaction card 210), and/or the like). In some implementations, secure element 274 may include application logic configured to receive inputs from input device 280 (e.g., directly or via controller 272), to provide outputs to output device 282 (e.g., directly or via controller 272), and/or the like.

NFC antenna 276 includes an antenna capable of transmitting and/or receiving information using an NFC protocol. For example, NFC antenna 276 may include a loop antenna (e.g., an NFC loop antenna), an inductor (e.g., an NFC inductor), and/or the like. In some implementations, NFC antenna 276 may be integrated into, or with, secure element 274 and/or NFC front end 278 (e.g., may be part of the same integrated circuit, such as a transaction IC).

NFC front end 278 includes one or more devices capable of communicating with external devices, such as merchant multi-function transaction card 210 and/or transaction terminal 220, using an NFC protocol. NFC front end 278 may be communicatively coupled to secure element 274, and configured to obtain card data from secure element 274 and provide the card data to transaction terminal 220, as described elsewhere herein. In some implementations, NFC front end 278 may be configured to receive card data from merchant multi-function transaction card 210 and provide the card data to secure element 274 for processing, as described elsewhere herein.

NFC front end 278 may include one or more radio modules for receiving and/or emitting NFC signals. NFC front end 278 may include one or more processors (e.g., microprocessor(s), microcontroller(s), and/or the like) and/or be coupled to one or more processors, such as controller 272, processor(s) included in secure element 274, and/or the like.

Although not shown, in some implementations, consumer multi-function transaction card 260 may include a transaction IC that includes an integrated circuit connecting secure element 274, NFC antenna 276, and/or one or more other components of consumer multi-function transaction card 260. For example, the transaction IC may include secure element 274, NFC antenna 276, NFC front end 278, connection(s) between secure element 274, NFC antenna 276, and NFC front end 278, and/or the like.

Input device 280 includes one or more components that permit consumer multi-function transaction card 260 to receive information, such as via user input (e.g., to initiate a transaction, such as to receive card data from merchant multi-function transaction card 210). For example, input device 280 may include an input component, such as input component described below in connection with FIG. 3. For example, input device 280 may include an accelerometer, pushbutton(s), touch sensor(s), keypad input(s), a camera, and/or the like.

Output device 282 includes one or more components that permit consumer multi-function transaction card 260 to provide output information (e.g., relating to transaction processing associated with merchant multi-function transaction card 210 and/or transaction terminal 220). For example, output device 282 may include an output component, such as output component 360 described below in connection with FIG. 3. For example, output device 282 may include dot matrix display(s), one or more LEDs (e.g., printed organic LEDs), and/or the like.

Communication device 284 includes a transceiver-like component that enables consumer multi-function transaction card 260 to communicate with other devices. For example, communication device 284 may include a communication interface, such as communication interface 370 described below in connection with FIG. 3. In some implementations, communication device 284 may include a Bluetooth communication interface, a BLE communication interface, and/or the like. In some implementations, communication device 284 may be included in, or integrated with, controller 272.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
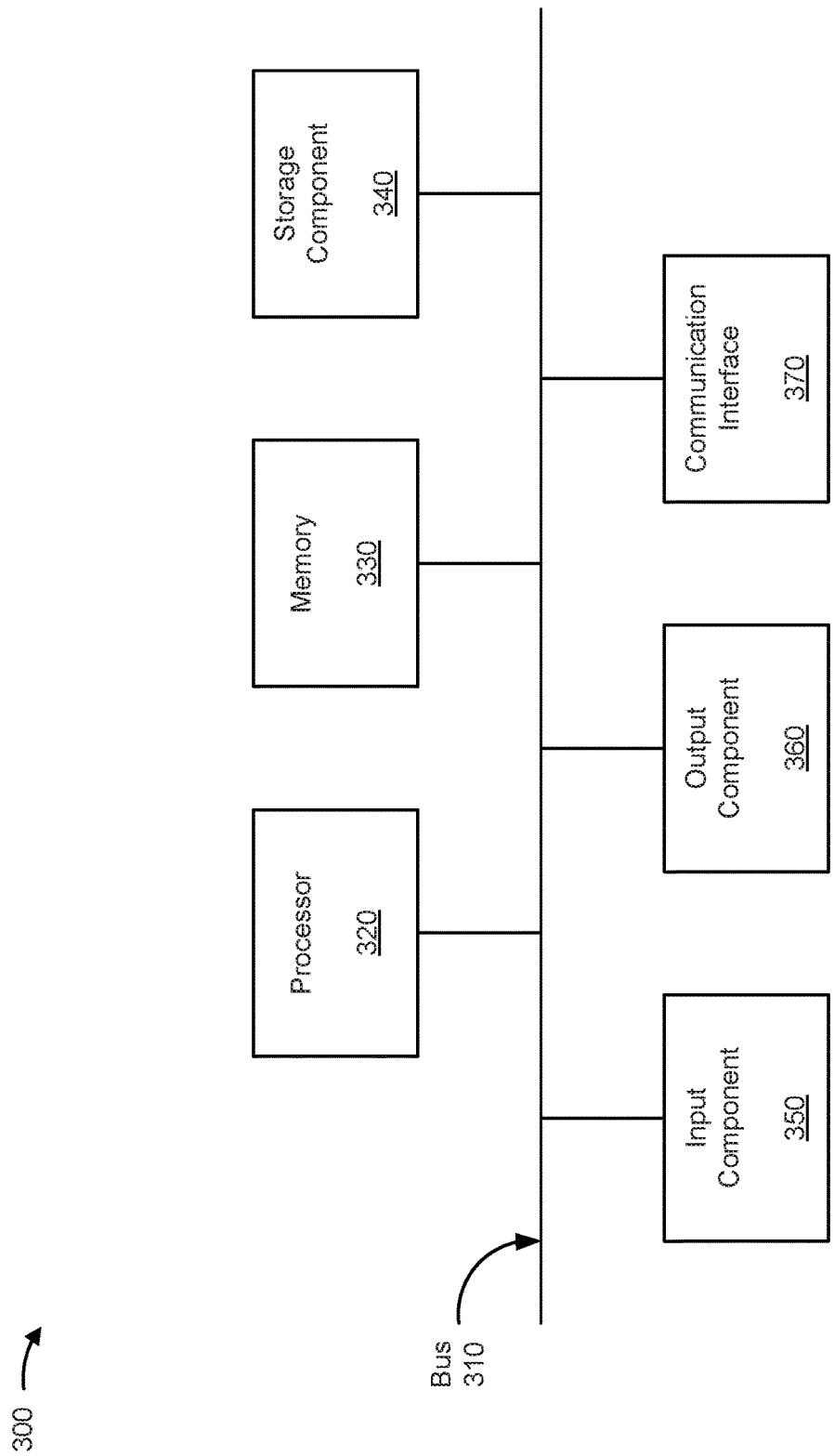
FIG. 3 is a diagram of example components of one or more devices of FIG. 2.

FIG. 3 is a diagram of example components of a device 300. Device 300 may correspond to merchant multi-function transaction card 210, transaction terminal 220, user device 230, transaction backend 250, and/or consumer multi-function transaction card 260. In some implementations, merchant multi-function transaction card 210, transaction terminal 220, user device 230, transaction backend 250, and/or consumer multi-function transaction card 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for authorizing a payment with a multi-function transaction card. In some implementations, one or more process blocks of FIG. 4 may be performed by a multi-function transaction card (e.g., merchant multi-function transaction card 210 and/or consumer multi-function transaction card 260) having a card body having dimensions that are in accordance with a standard for transaction cards, an output device on the card body, a secure element within the card body, one or more memories within the card body, and/or one or more processors within the card body, wherein the one or more processors are communicatively coupled to the one or more memories. In some implementations, one or more process blocks of FIG. 4 may be performed by another device or a group of devices separate from or including the multi-function transaction card, such as a transaction terminal (e.g., transaction terminal 220), a user device (e.g., user device 230), a transaction backend (e.g., transaction backend 250), and/or the like.

As shown in FIG. 4, process 400 may include pairing, via a wireless connection, the multi-function transaction card with a terminal (block 410). For example, the multi-function transaction card (e.g., using processor 320, memory 330, storage component 340, input component 350, output component 360, communication interface 370, and/or the like) may pair, via a wireless connection, the multi-function transaction card with a terminal, as described above.

As further shown in FIG. 4, process 400 may include receiving, from the terminal, information associated with a transaction (block 420). For example, the multi-function transaction card (e.g., using processor 320, memory 330, storage component 340, input component 350, output component 360, communication interface 370, and/or the like) may receive, from the terminal, information associated with a transaction, as described above.

As further shown in FIG. 4, process 400 may include generating, based on the information associated with the transaction, and using a cryptographic key, an authorization request cryptogram (ARQC), wherein the cryptographic key is stored in the secure element (block 430). For example, the multi-function transaction card (e.g., using processor 320, memory 330, storage component 340, input component 350, output component 360, communication interface 370, and/or the like) may generate, based on the information associated with the transaction, and using a cryptographic key, an authorization request cryptogram (ARQC), as described above. In some implementations, the cryptographic key is stored in the secure element.

As further shown in FIG. 4, process 400 may include generating, based on the ARQC, a machine-readable code (block 440). For example, the multi-function transaction card (e.g., using processor 320, memory 330, storage component 340, input component 350, output component 360, communication interface 370, and/or the like) may generate, based on the ARQC, a machine-readable code, as described above.

As further shown in FIG. 4, process 400 may include displaying, using the output device, the machine-readable code (block 450). For example, the multi-function transaction card (e.g., using processor 320, memory 330, storage component 340, input component 350, output component 360, communication interface 370 and/or the like) may display, using the output device, the machine-readable code, as described above.

Process 400 may include additional implementations, such as any single implementation or any combination of implementations described below and/or in connection with one or more other processes described elsewhere herein.

In a first implementation, the one or more processors are configured to, when receiving, from the terminal, the information associated with the transaction, receive, from the terminal, the information associated with the transaction via the wireless connection.

In a second implementation, alone or in combination with the first implementation, the wireless connection comprises at least one of a Bluetooth connection or near-field communication connection.

In a third implementation, alone or in combination with one or more of the first and second implementations, the information associated with the transaction comprises an amount of the transaction.

In a fourth implementation, alone or in combination with one or more of the first through third implementations, the terminal comprises another multi-function transaction card, and the other multi-function transaction card comprises an image sensor for capturing an image of the machine-readable code.

In a fifth implementation, alone or in combination with one or more of the first through fourth implementations, the output device comprises at least one of a dot matrix display, an electronic ink display, or a light-emitting-diode display.

In a sixth implementation, alone or in combination with one or more of the first through fifth implementations, the machine-readable code comprises at least one of a Quick Response code, a matrix barcode, or a one-dimensional barcode.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for authorizing a payment with a multi-function transaction card. In some implementations, one or more process blocks of FIG. 5 may be performed by a multi-function transaction card (e.g., merchant multi-function transaction card 210 and/or consumer multi-function transaction card 260). In some implementations, one or more process blocks of FIG. 5 may be performed by another device or a group of devices separate from or including the multi-function transaction card, such as a transaction terminal (e.g., transaction terminal 220), a user device (e.g., user device 230), a transaction backend (e.g., transaction backend 250), and/or the like.

As shown in FIG. 5, process 500 may include receiving, from a terminal, information associated with a transaction, wherein the multi-function transaction card has dimensions that are in accordance with a standard for transaction cards (block 510). For example, the multi-function transaction card (e.g., using processor 320, memory 330, storage component 340, input component 350, output component 360, communication interface 370, and/or the like) may receive, from a terminal, information associated with a transaction, as described above. In some implementations, the multi-function transaction card has dimensions that are in accordance with a standard for transaction cards.

As further shown in FIG. 5, process 500 may include generating based on the information associated with the transaction, and using a cryptographic key, an authorization request cryptogram (ARQC), wherein the cryptographic key is stored in a secure element, and wherein the multi-function transaction card comprises the secure element (block 520). For example, the multi-function transaction card (e.g., using processor 320, memory 330, storage component 340, input component 350, output component 360, communication interface 370, and/or the like) may generate based on the information associated with the transaction, and using a cryptographic key, an authorization request cryptogram (ARQC), as described above. In some implementations, the cryptographic key is stored in a secure element. In some implementations, the multi-function transaction card comprises the secure element.

As further shown in FIG. 5, process 500 may include generating, based on the ARQC, an optical pattern (block 530). For example, the multi-function transaction card (e.g., using processor 320, memory 330, storage component 340, input component 350, output component 360, communication interface 370, and/or the like) may generate, based on the ARQC, an optical pattern, as described above.

As further shown in FIG. 5, process 500 may include outputting, using an output device, the optical pattern (block 540). For example, the multi-function transaction card (e.g., using processor 320, memory 330, storage component 340, input component 350, output component 360, communication interface 370, and/or the like) may output, using an output device, the optical pattern, as described above.

Process 500 may include additional implementations, such as any single implementation or any combination of implementations described below and/or in connection with one or more other processes described elsewhere herein.

In a first implementation, receiving, from the terminal, the information associated with the transaction comprises receiving, from the terminal, the information associated with the transaction via a wireless connection.

In a second implementation, alone or in combination with the first implementation, the wireless connection comprises at least one of a Bluetooth connection or near-field communication connection.

In a third implementation, alone or in combination with one or more of the first and second implementations, the multi-function transaction card is a first multi-function transaction card, the terminal comprises a second multi-function transaction card, and the second multi-function transaction card comprises a sensor for receiving the optical pattern.

In a fourth implementation, alone or in combination with one or more of the first through third implementations, the terminal is a mobile device.

In a fifth implementation, alone or in combination with one or more of the first through fourth implementations, the optical pattern comprises a machine-readable code, and outputting the optical pattern comprises displaying, using the output device, the machine-readable code.

In a sixth implementation, alone or in combination with one or more of the first through fifth implementations, the optical pattern comprises a pulsed light pattern, and outputting the optical pattern comprises emitting, using the output device and based on the pulsed light pattern, a series of light pulses.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for authorizing a payment with a multi-function transaction card. In some implementations, one or more process blocks of FIG. 6 may be performed by a multi-function transaction card (e.g., merchant multi-function transaction card 210 and/or consumer multi-function transaction card 260). In some implementations, one or more process blocks of FIG. 6 may be performed by another device or a group of devices separate from or including the multi-function transaction card, such as a transaction terminal (e.g., transaction terminal 220), a user device (e.g., user device 230), a transaction backend (e.g., transaction backend 250), and/or the like.

As shown in FIG. 6, process 600 may include pairing, via a wireless connection, a multi-function transaction card with a terminal (block 610). For example, the multi-function transaction card (e.g., using processor 320, memory 330, storage component 340, input component 350, output component 360, communication interface 370, and/or the like) may pair, via a wireless connection, a multi-function transaction card with a terminal, as described above.

As further shown in FIG. 6, process 600 may include receiving, from the terminal, information associated with a transaction (block 620). For example, the multi-function transaction card (e.g., using processor 320, memory 330, storage component 340, input component 350, output component 360, communication interface 370, and/or the like) may receive, from the terminal, information associated with a transaction, as described above.

As further shown in FIG. 6, process 600 may include generating, based on the information associated with the transaction and using a cryptographic key, an authorization request cryptogram (ARQC), wherein the cryptographic key is stored in a secure element in the multi-function transaction card (block 630). For example, the multi-function transaction card (e.g., using processor 320, memory 330, storage component 340, input component 350, output component 360, communication interface 370, and/or the like) may generate, based on the information associated with the transaction and using a cryptographic key, an authorization request cryptogram (ARQC), as described above. In some implementations, the cryptographic key is stored in a secure element in the multi-function transaction card.

As further shown in FIG. 6, process 600 may include generating, based on the ARQC, a pulsed light pattern (block 640). For example, the multi-function transaction card (e.g., using processor 320, memory 330, storage component 340, input component 350, output component 360, communication interface 370, and/or the like) may generate, based on the ARQC, a pulsed light pattern, as described above.

As further shown in FIG. 6, process 600 may include causing an output device of the multi-function transaction card to emit, based on the pulsed light pattern, a series of light pulses (block 650). For example, the multi-function transaction card (e.g., using processor 320, memory 330, storage component 340, input component 350, output component 360, communication interface 370, and/or the like) may cause an output device of the multi-function transaction card to emit, based on the pulsed light pattern, a series of light pulses, as described above.

Process 600 may include additional implementations, such as any single implementation or any combination of implementations described below and/or in connection with one or more other processes described elsewhere herein.

In a first implementation, the one or more instructions, that cause the one or more processors to receive, from the terminal, the information associated with the transaction, cause the one or more processors to receive, from the terminal, the information associated with the transaction via the wireless connection.

In a second implementation, alone or in combination with the first implementation, the wireless connection comprises at least one of a Bluetooth connection or near-field communication connection.

In a third implementation, alone or in combination with one or more of the first and second implementations, the terminal comprises another multi-function transaction card, and the other multi-function transaction card comprises, for receiving the series of light pulses, at least one of an image sensor or a light sensor.

In a fourth implementation, alone or in combination with one or more of the first through third implementations, the output device comprises a plurality of light-emitting-diodes, and the one or more instructions, that cause the one or more processors to cause the output device to emit the series of light pulses, cause the one or more processors to cause the output device to illuminate, based on the series of light pulses, one or more of the plurality of light-emitting-diodes.

In a fifth implementation, alone or in combination with one or more of the first through fourth implementations, the one or more instructions, that cause the one or more processors to cause the output device to emit the series of light pulses, cause the one or more processors to cause the output device to emit, using pulse-width modulation, the series of light pulses.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a mobile device, first information from a merchant multi-function transaction card, wherein the mobile device is a consumer multi-function transaction card of a consumer;
   identifying, by the mobile device, a cryptogram based on receiving the first information from the merchant multi-function transaction card;
   generating, by the mobile device, a light pattern based on the cryptogram; and
   providing, by the mobile device and for display, second information based on the light pattern and only after the mobile device senses a consumer input of the consumer,
      wherein the consumer input is a sequence, unique to the consumer, and associated with the mobile device, and wherein the sequence includes:
a touch input that relates to an amount of time that the consumer remained in contact with the consumer multi-function transaction card, and
a movement input by the consumer moving the consumer multi-function transaction card in a particular motion.

2. The method of claim 1, wherein the first information includes transaction information associated with a transaction.

3. The method of claim 1, wherein the cryptogram is identified further based on a card key stored by a secure element of the mobile device.

4. The method of claim 1, wherein providing the second information comprises:
providing an optical pattern as a combination of a machine-readable code and the light pattern.

5. The method of claim 4,
wherein the machine-readable code includes a first portion of the second information, and
wherein the light pattern includes a second portion of the second information.

6. The method of claim 1,
wherein the second information is provided only when the mobile device is in presence of a device associated with the consumer, and
wherein the device associated with the consumer is a user device.

7. The method of claim 1, wherein the second information is provided only when the mobile device is physically located proximate to a terminal associated with the first information based on a near-field communication (NFC) sensor.

8. The method of claim 1,
wherein the sequence further includes one or more of:
a tapping by the consumer on the consumer multi-function transaction card,
a pinching touch by the consumer on the consumer multi-function transaction card, or
a swiping touch by the consumer on the consumer multi-function transaction card.

9. The method of claim 1, wherein the particular motion comprises a waving motion.

10. The method of claim 1, wherein the touch input comprises a flexing of the consumer multi-function transaction card performed by applying force to one or more edges of the consumer multi-function transaction card.

11. A mobile device, comprising:
one or more memories; and
one or more processors, communicatively coupled to the one or more memories, configured to:
receive first information from a merchant multi-function transaction card, wherein the mobile device is a consumer multi-function transaction card of a consumer;
identify a cryptogram based on receiving the first information from the merchant multi-function transaction card;
generate a light pattern based on the cryptogram; and
provide, for display, second information based on the light pattern and only after the mobile device senses a consumer input of the consumer,
wherein the consumer input is a sequence, unique to the consumer, and associated with the mobile device, and
wherein the sequence includes:
a touch input that relates to an amount of time that the consumer remained in contact with the consumer multi-function transaction card, and
a movement input by the consumer moving the consumer multi-function transaction card in a particular motion.

12. The mobile device of claim 11, wherein the first information includes transaction information associated with a transaction.

13. The mobile device of claim 11, wherein the cryptogram is identified further based on a card key stored by a secure element of the mobile device.

14. The mobile device of claim 11, wherein the one or more processors, when providing the second information, are configured to:
provide an optical pattern as a combination of a machine-readable code and the light pattern.

15. The mobile device of claim 11, wherein the second information is provided only when the mobile device is in presence of a device associated with the consumer.

16. The mobile device of claim 11, wherein the second information is provided only when the mobile device is physically located proximate to a terminal associated with the first information based on a near-field communication (NFC) sensor.

17. A non-transitory computer-readable medium storing a set of instructions, the set of instructions comprising:
one or more instructions that, when executed by one or more processors of a consumer multi-function transaction card of a consumer, cause the consumer multi-function transaction card to:
receive first information from a merchant multi-function transaction card;
identify a cryptogram based on receiving the first information from the merchant multi-function transaction card;
generate a light pattern based on the cryptogram; and
provide, for display, second information based on the light pattern and only after a mobile device senses a consumer input of the consumer,
wherein the consumer input is a sequence, unique to the consumer, and associated with the mobile device, and
wherein the sequence includes:
a touch input that relates to an amount of time that the consumer remained in contact with the consumer multi-function transaction card, and
a movement input by the consumer moving the consumer multi-function transaction card in a particular motion.

18. The non-transitory computer-readable medium of claim 17, wherein the first information includes transaction information associated with a transaction.

19. The non-transitory computer-readable medium of claim 17, wherein the second information is provided only when the consumer multi-function transaction card is physically located proximate to a terminal associated with the first information based on a near-field communication (NFC) sensor.

20. The non-transitory computer-readable medium of claim 17, wherein the sequence further includes one or more of:
a tapping by the consumer on the consumer multi-function transaction card,
a pinching touch by the consumer on the consumer multi-function transaction card, or a swiping touch by the consumer on the consumer multi-function transaction card.

\* \* \* \* \*